(12) United States Patent
Malekpour

(10) Patent No.: US 8,981,681 B2
(45) Date of Patent: Mar. 17, 2015

(54) MOTORIZED BLIND CONTROL DEVICES, METHODS OF USE THEREOF

(76) Inventor: Gholamali Malekpour, San Diego, CA (US)

(*) Notice: Subject to any disclaimer, the term of this patent is extended or adjusted under 35 U.S.C. 154(b) by 372 days.

(21) Appl. No.: 13/359,395

(22) Filed: Jan. 26, 2012

(65) Prior Publication Data

US 2012/0193035 A1 Aug. 2, 2012

Related U.S. Application Data

(60) Provisional application No. 61/437,171, filed on Jan. 28, 2011.

(51) Int. Cl.
| | | |
|---|---|---|
| *H02K 7/12* | (2006.01) | |
| *H02P 5/00* | (2006.01) | |
| *G05B 5/00* | (2006.01) | |
| *H02P 7/00* | (2006.01) | |
| *H02P 3/00* | (2006.01) | |
| *H02P 1/00* | (2006.01) | |
| *E06B 9/36* | (2006.01) | |
| *E05F 15/20* | (2006.01) | |
| *E06B 9/78* | (2006.01) | |

(52) U.S. Cl.
CPC .............. *E06B 9/36* (2013.01); *E05F 15/2007* (2013.01); *E05F 15/2092* (2013.01); *E06B 9/368* (2013.01); *E06B 9/78* (2013.01); *E05Y 2900/146* (2013.01)
USPC .............................. 318/40; 318/466; 318/266

(58) Field of Classification Search
None
See application file for complete search history.

(56) References Cited

U.S. PATENT DOCUMENTS

| | | | |
|---|---|---|---|
| 1,978,152 A | 10/1934 | Lawrence | |
| 4,096,903 A | 6/1978 | Ringle | |
| 4,644,990 A | 2/1987 | Webb | |
| 4,869,308 A | 9/1989 | Chang | |
| 4,914,360 A | 4/1990 | Hsieh | |
| 5,391,967 A | 2/1995 | Domel | |
| 5,495,153 A | 2/1996 | Domel | |
| 5,547,008 A | 8/1996 | Sullivan | |
| 5,603,371 A | 2/1997 | Gregg | |
| 5,627,767 A * | 5/1997 | Gabiniewicz et al. | 702/41 |
| 6,060,852 A | 5/2000 | Domel | |
| 6,112,798 A | 9/2000 | Cheng | |
| 6,201,364 B1 * | 3/2001 | Will et al. | 318/466 |
| 6,369,530 B2 | 4/2002 | Kovach | |
| 6,910,515 B2 | 6/2005 | Nien | |
| 7,204,292 B2 | 4/2007 | Nien | |
| 2005/0189078 A1 | 9/2005 | Whiting | |
| 2006/0185799 A1 * | 8/2006 | Kates | 160/5 |
| 2006/0207730 A1 * | 9/2006 | Berman et al. | 160/310 |
| 2006/0288644 A1 * | 12/2006 | Vasquez | 49/74.1 |
| 2007/0221338 A1 * | 9/2007 | Meewis et al. | 160/7 |

(Continued)

OTHER PUBLICATIONS

US Patent & Trademark Office, non-final Office Action for U.S. Appl. No. 13/909,991 (Malekpour), mailed Sep. 24, 2014.

*Primary Examiner* — Paul Ip
*Assistant Examiner* — Devon Joseph

(57) ABSTRACT

Systems and methods for controlling blind systems and other systems with moving parts are disclosed. Certain systems and methods couple to a blind system, and include one or more transceiving, processing, sensor, motion delivery, power delivery, and various other components for collectively or individually controlling a blind system to open or close its blinds. Certain systems and methods utilize preprogrammed control instructions stored locally, or user-initiated control signals received from remote devices to control the blind system.

16 Claims, 14 Drawing Sheets

(56) References Cited

U.S. PATENT DOCUMENTS

2008/0303686 A1 12/2008 Mosbrucker
2009/0065598 A1* 3/2009 Quirino et al. .................. 236/51
2009/0273307 A1 11/2009 Mosbrucker
2012/0025717 A1* 2/2012 Klusmann et al. ............ 315/152
2013/0085615 A1* 4/2013 Barker .......................... 700/277

* cited by examiner

MOTORIZED BLIND CONTROL DEVICES, METHODS OF USE THEREOF

CROSS-REFERENCE TO RELATED APPLICATIONS

This application claims priority under 35 U.S.C. §119(e) to U.S. Provisional Patent Application Ser. No. 61/437,171, filed Jan. 28, 2011, entitled REMOTE CONTROL WAND FOR BLINDS, the content of which is hereby incorporated by reference herein in its entirety for all purposes.

FIELD OF THE INVENTION

The invention relates generally to systems and methods for controlling systems with moving parts. In particular, the invention relates to systems and methods for controlling, for example by remote activation, an actuating mechanism of a blind system to open or close blinds of that blind system.

BACKGROUND OF THE INVENTION

Manual operation by a user of window blinds is well known. In the past, users simply approach a window blind system and physically adjust the blinds using an attached baton, chain or rope. However, manual operation requires user intervention, and does not permit intelligent use of blinds during periods when human intervention is unavailable, resulting in energy inefficiency and unnecessary cost to a user.

Some systems and methods have tried to automate operation of window blinds to trim energy inefficiency and cost. However, these systems and methods are often expense, difficult to install, require structural modification of the window blind system, require the skill of a professional and costly installer, use hard to access power sources, and do not use information about interior and exterior circumstances relating to the position of a particular window blind system.

For the above reasons, and others, there exists a need for an automated blind control device that can be inexpensively and easily installed to a blind system without significant modification of the blind system.

SUMMARY OF THE INVENTION

In accordance with the present invention, systems and methods for controlling blinds are described. These systems and methods may be carried out using a remote device (e.g., a remote control, a computer, a mobile phone, etc.). The system and methods may provide for an outer housing having an inner cavity sized to include various components. Such components may include: a motor having a motor shaft configured to rotate about a first axis; a power source configured to power the motor; a first connector configured to rotate about the first axis and having a first feature configured to couple the first connector to the actuating mechanism; a second connector configured to rotate about the first axis and having a second feature configured to couple the second connector to the motor; and a magnetic clutch comprising a first magnet coupled to the first connector and a second magnet coupled to the second connector. The magnetic clutch may be configured to cause the first connector and the second connector to rotate around the first axis when the one or more blinds are partially open and when the motor shaft rotates about the first axis. The magnetic clutch may be further configured to prevent the first connector from rotating around the first axis and to permit the second connector to rotate around the first axis when the one or more blinds are fully open or fully closed and when the motor shaft rotates about the first axis.

The systems and methods may further provide for a sensor and a controller configured to control the rotation of the motor shaft based on temperature, light, sound or motion information collected by the sensor. The systems and methods may also provide for an anti-rotation feature attached to or formed on the outer housing and configured to prevent the outer housing from rotating when the motor shaft rotates.

The systems and methods may alternatively provide for a sensor and a processing component operable to: receive information from the sensor; cause the motor shaft to rotate about the first axis based on first information from the sensor specifying an ambient temperature level that exceeds a predefined threshold temperature level; cause the motor shaft to rotate about the first axis based on second information from the sensor specifying an ambient light level that exceeds a predefined threshold light level; cause the motor shaft to rotate about the first axis based on first information from the sensor specifying a sound that matches a stored sound profile; and cause the motor shaft to rotate about the first axis based on second information from the sensor specifying a detected motion.

The processing component may also or alternatively be operable to receive information specifying a time of day, compare the time of day to a stored time of day to determine if the received time of day matches the stored time of day, and cause the motor shaft to rotate about the first axis when the received time of day matches the stored time of day.

The processing component may also or alternatively be operable to receive user instructions from a remote device over a wireless transmission channel that instruct the processor to cause the motor shaft to rotate about the first axis in a first direction or a second direction so as to close or open the blinds, respectively. The processor may then cause the motor shaft to rotate in the first or second direction responsive to the user instructions.

The systems and methods may also provide for a computer program product comprising a computer usable medium having a computer readable program code embodied therein, where the computer readable program code is adapted to be executed to implement a method for controlling blinds. Such a method may provide for receiving information specifying a condition, and causing a motor shaft to rotate about the first axis based on the condition. The information may be received from a remote device over a wireless transmission channel, a temperature sensor, a light sensor, or a timer. The condition may specify wirelessly-transmitted instructions to open or close the blinds, an ambient temperature level, an ambient light level, a time of day, or an amount of elapsed time.

BRIEF DESCRIPTION OF THE DRAWINGS

The present application may be more fully appreciated in connection with the following detailed description taken in conjunction with the accompanying drawings.

DETAILED DESCRIPTION OF THE INVENTION

Figure 1A:
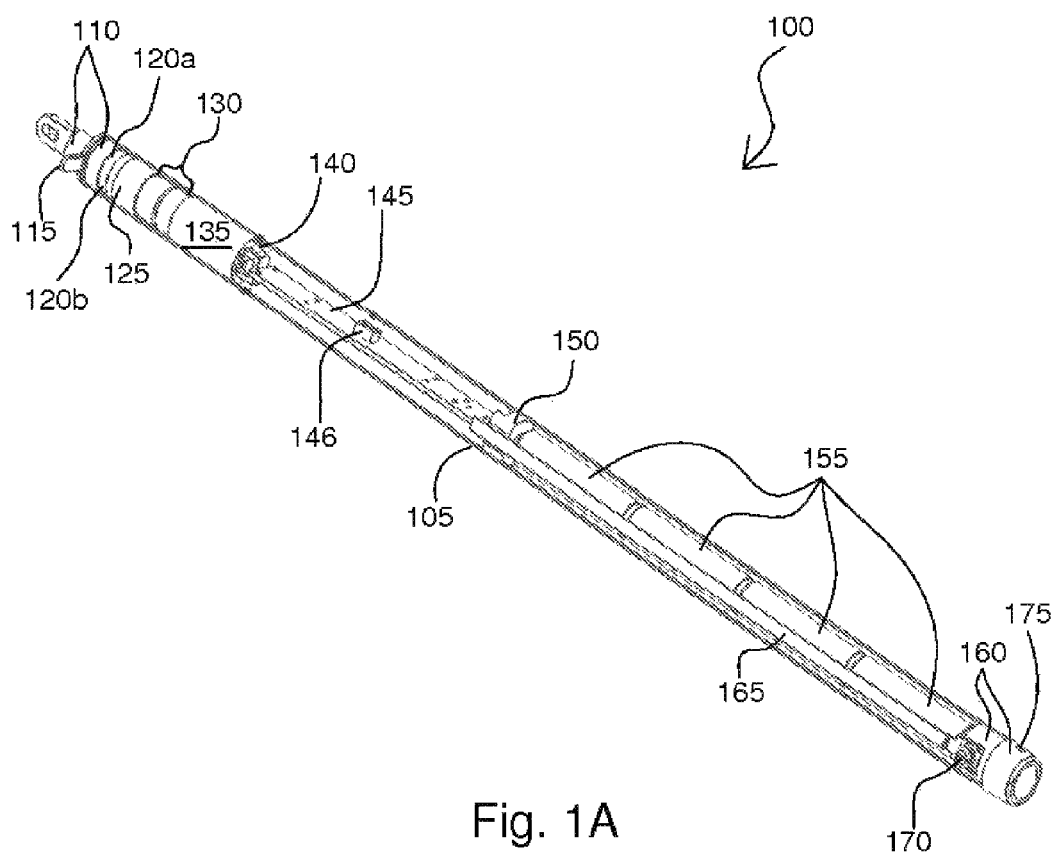
FIGS. 1A-C depict different orientations of a blind control device having various components.

Various aspects of the invention are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways.

Aspects of the invention may feature mechanical, electric and/or other systems for controlling the position of blinds commonly used in windows and doors. It is to be understood, however, that the inventive aspects described herein and understood by those skilled in the art can be applied to all types of blinds and other systems with moving parts.

The present invention offers various advantages over previous systems and methods for controlling blind systems. For example, one aim of the present invention relates to ease of installation and use. As one of skill in the art will come to understand, the inventive aspects of the present invention permit a user to install various implementations of the invention without having to dismantle or substantially modify the blind system. In accordance with several embodiments, a user need only attach that embodiment's inventive blind control device to existing actuators of typical blind systems. Attachment may require only having to slide an embodiment's inventive blind control device over a hook or other feature, or into a cavity without any need of cutting or otherwise modifying the blind control device. Users of the various inventive blind control devices will benefit greatly by avoiding the significant investment of time (e.g., in relation to user installation) and/or money (e.g., in relation to professional installation) required to install previous blind control devices. Certain inventive blind control devices are also significantly smaller than previous blind control devices, and can be attached to a blind system to appear as if the respective blind control device was part of that blind system.

Further benefit is created by the power delivery aspects of various embodiments. For example, use of batteries as opposed to hardwiring to electrical conduits behind a wall, permit a user to quickly install those embodiments without any need to hire an electrician. Furthermore, the batteries are easily accessible, and can be changed by removing a cap.

Various embodiments described herein permit a user to easily program and control that embodiment's blind control device using wireless data/signal transmission or by activating physical components (e.g., a manual switch, push button, etc.) on the blind control device. For example, programming and control may occur at/from a wireless device (e.g., a mobile computing device, a computer or router capable of transmitting wireless signals, a remote control device). Signals/data may be received from and/or sent to those wireless devices using RF, IR, Bluetooth, or other wireless technologies. The present invention contemplates appropriate software (e.g., applications for displaying a user interface, software for controlling a motor or other drive mechanism of certain blind control devices) and hardware (e.g., processors, sensors, switches, etc.) at the wireless devices and the blind control devices to carry out and manage the programming and control functionality described herein.

One of skill in the art will appreciate various control commands, including commands for rotating a motor axle (described in more detail below) in one direction to open blinds a desired amount and rotating the motor axle in the other direction to close the blinds a desired amount. For example, when a user presses any of various buttons on a wireless device, a signal may be sent to a processing unit of the blind control device, which in turn controls the rotation of the motor shaft to open or close the blinds. Pressing one button/switch and releasing it may result in the blinds opening or closing to a predetermined position (e.g., opening to let in the most light or closing to block the most light). Pressing another button and releasing it may result in the blinds opening or closing only for the period of time in which the button was push. Under this scenario, a user would have to press and hold the button until the blinds have opened or closed a desired amount. Pressing another button may control any number of blind systems and subsets of blind systems. Pressing yet another button may indicate a predefined operation (e.g., the opening or closing of the blinds at a later time or under certain conditions). One of skill in the art will appreciate that user-activated buttons can be replaced by a computer interface where a user selects presently-desired or scheduled operations.

One of skill in the art will further appreciate various programming commands using the same buttons/switches and/or user interfaces.

Programming and control of certain inventive blind control devices may alternatively involve sensors and/or processing components that receive input relating to light, sound, motion, position of blinds, temperature, time or other properties/characteristics, and then use received input to control a blind system. Such sensors and/or processing components would be positioned within and/or on an external surface of a respective blind control device.

In accordance with one example, a blind control device may include or use information from a sensor to determine when sensed ambient light (e.g., sunlight) exceeds a threshold brightness level (e.g., a brightness level determined by a user-programmable or preset value), and may then control a blind system to open or close its blinds. By way of another example, a blind control device may include a sensor that determines if sensed ambient temperature exceeds or falls below a threshold temperature level (e.g., a temperature level determined by a user-programmable or preset value), and may then control a blind system to open or close its blinds based on the determination. A blind control device may also or alternatively respond to sound (e.g., a human voice, including the user-programmable or preset words "open" and "close") or to motion (e.g., a human entering a room).

A blind control device may also or alternatively control a blind system to open or close its blinds based on the time of day (e.g., as determined by an internal time-keeping component, or as determined by a signal received from an external device such as a clock). Or, the blind control device may control a blind system to open or close its blinds based on a predefined time period since an event as determined by an internal or external time-keeping component or device (e.g., since the blinds opened or closed, since a sensed amount of light exceeded a threshold level of light, etc.).

One of skill in the art will appreciate that the sensor information regarding temperature, light, motion and sound, and the timer information may be obtained by the blind control device from remote sensors and timers not physically attached to the blind control device. Receipt of such sensor and timer information may be obtained using various wireless signal transmission techniques described herein in relation to remote wireless devices.

For a better understanding of certain aspects and features of the present invention, attention is drawn to the following Overview.

Overview

While the details of the embodiments of the invention may vary and still be within the scope of the claimed invention, one of skill in the art will appreciate that the figures described herein are not intended to suggest any limitation as to the scope of use or functionality of the inventive aspects. Neither should the figures and there description be interpreted as having any dependency or requirement relating to any one or combination of components illustrated in those figures.

Aspects and features of the invention are designed to operate in relation to mechanical and/or electrical systems with movable components. In accordance with various embodiments described herein, aspects and features of the invention are designed to manipulate one or more vertical and horizontal louvers/slats (generally referred to herein as "blinds") of a blind system by transferring rotational motion from a motor to an actuator mechanism of the blind system that opens and closes the blind louvers/slats. Such actuator mechanisms may include, without limitation, tilt mechanisms (e.g., with a wand or baton attached thereto), ropes, chains and other components of blind systems that open and close blind louvers/slats.

It will be understood that the terms "blind" or "louver" or "slat" may refer to individual vertical or horizontal members of blind systems which are capable of being opened, closed or otherwise adjusted. The term "tilt mechanism" may refer to an actuating mechanism that enables the opening, closing or other adjustments to the blinds. It will be understood that "blind system" is described herein as a single blind system. However, the teachings herein may apply to control of several blind systems, each with a blind control device, and each controlled by the same remote control device.

Blind Control Device

Attention is now drawn to FIGS. 1A-C, which depict different orientations of a blind control device 100 having various components described below. The blind control device 100 depicted in FIG. 1 may take various configurations within the scope and spirit of the invention. For example, the disclosed system may be configured to include an outer housing 105 of any shape, including cylindrical, rectangular, triangular, polygonal, spherical, cubic or other geometric shapes. The outer housing 105 may be covered in any sort of design and material. The blind control device 100 may further include a blind connector component 110, an anti-rotation feature 115, one or more magnets 120a-b, a motor connector component 125, a motor 130, a motor housing 135, a rotation-locking pin 140, a circuit board 145 or other suitable processing/control component with a control interface 146, a first battery connector 150, one or more batteries 155 (e.g., of any size or type and in any configuration) or other suitable power source, a second battery connector and end cap 160, a power lead 165, a screw 170 and a pin hole 175. Each of these components and their relationships to each other are described in more detail below with respect to various features.

Figure 1B:
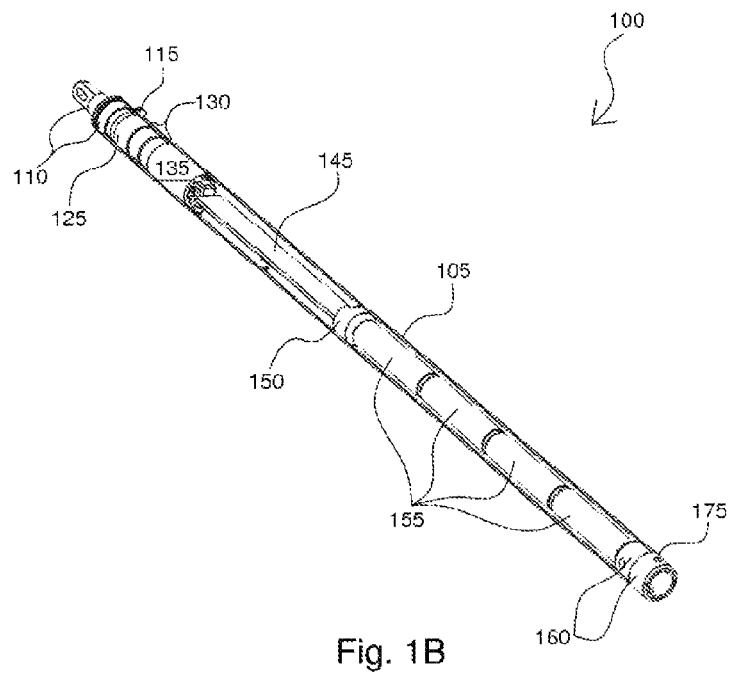
Figure 1C:
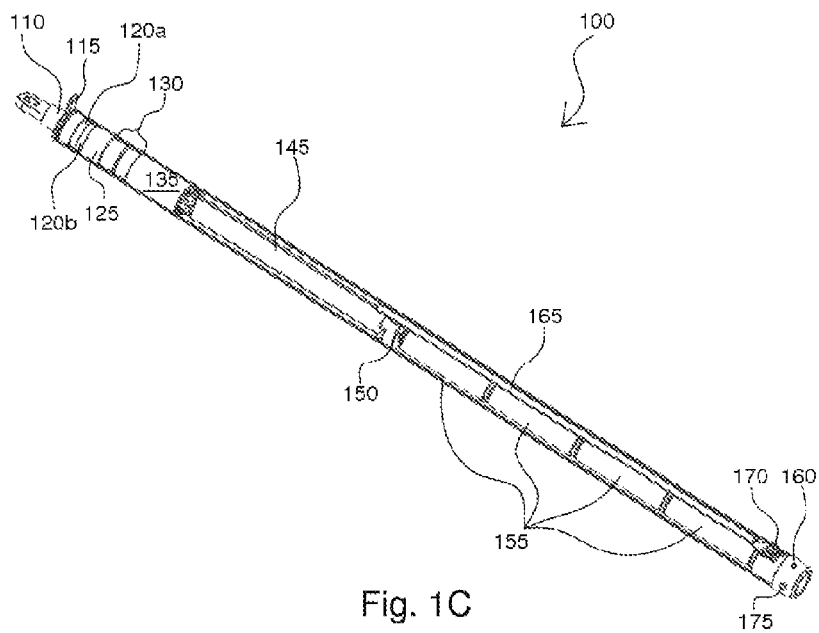
Figure 2:
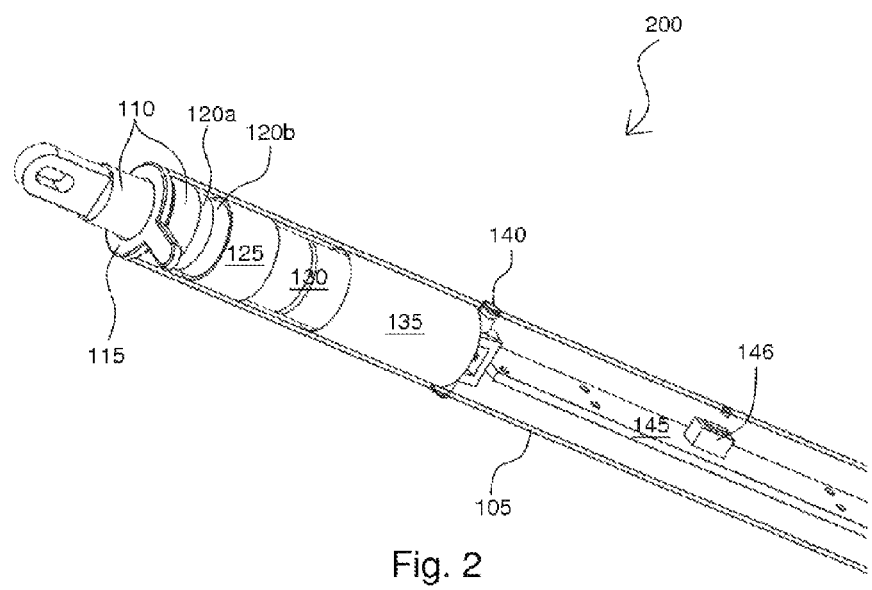
FIG. 2 depicts a first portion of a blind control device.
Figure 9:
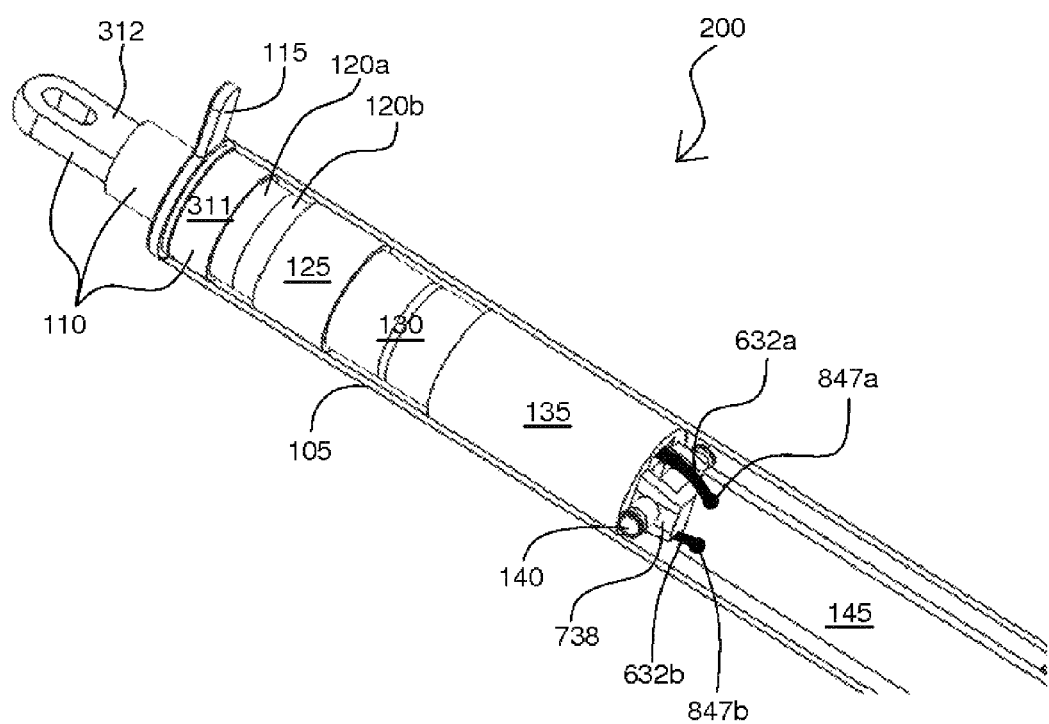
FIG. 9 depicts a different orientation of the first portion from FIG. 2.

Attention is turned to FIG. 2 though FIG. 9, which depict various components from FIGS. 1A-C that may be used to cause the blind connector 110 to rotate in relation to force provided by the motor 130. FIG. 2, for example, depicts a first portion 200 of the blind control device 100 of FIGS. 1A-C.

Figures 3A, 3B, 3C:
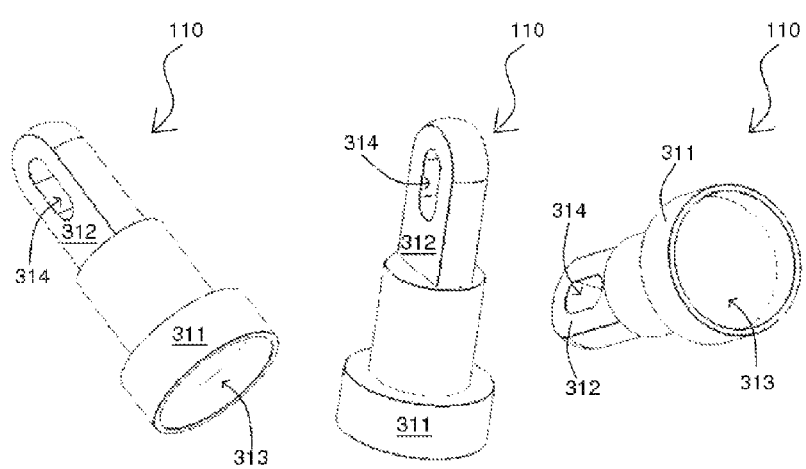
FIGS. 3A-C depict several orientations of a blind connector component.

FIGS. 3A-C depict several orientations of the blind connector component 110. As shown, the blind connector component 110 may include a magnet receiving section 311 and a blind connection section 312. The magnet receiving section 311 may include a cavity 313 that is configured to receive magnet 120a. Adhesive, friction, a mechanical fastener, or another method of attachment may be used to hold magnet 120a in place within the cavity 313 formed by the magnet receiving section 311. Blind connection section 312 may include a receiving slot 314 disposed to receive a hook or other feature of a blind system (not shown) that, when rotated, manipulates the blinds to open, close or perform some other movement.

Figure 18A:
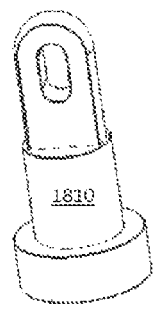
FIGS. 18A-C depict several orientations of a blind connector component that connects directly to a motor.
Figure 18B:
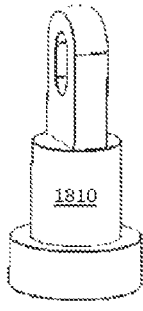
Figure 18C:
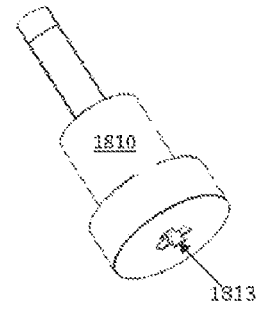
Figure 19:
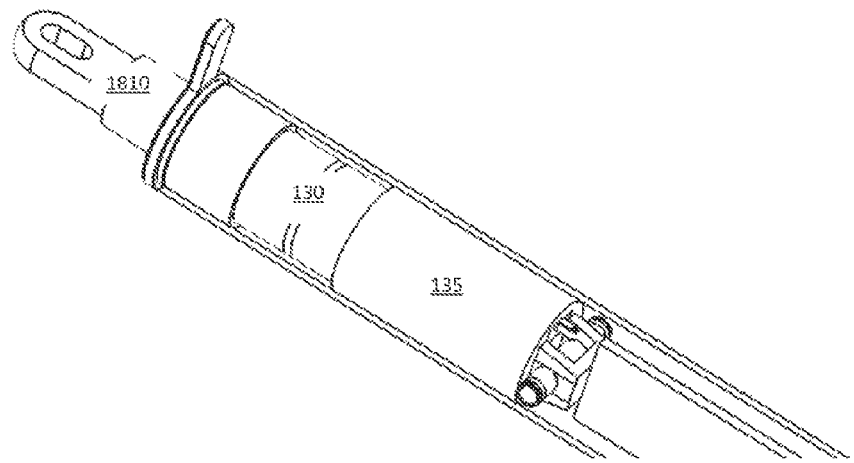
FIG. 19 depicts a first portion of the blind control device showing a configuration using a blind connector component.

FIGS. 18A-C depict several orientations of a blind connector component 1810. As shown, the blind connector component 1810 may include a motor connection cavity 1813 that is configured to receive a motor shaft (e.g., motor shaft 631 of FIG. 6). One of skill in the art will appreciate that the motor connection cavity 1813 may take any shape or form to couple to the motor shaft. In cases where the motor shaft is a female configuration, the cavity 1813 may instead take the form of a male counterpart for that female configuration. Adhesive, friction, a mechanical fastener, or another method of attachment may be used to hold magnet motor shaft in place within the cavity 1813.

Figures 4A, 4B, 4C:
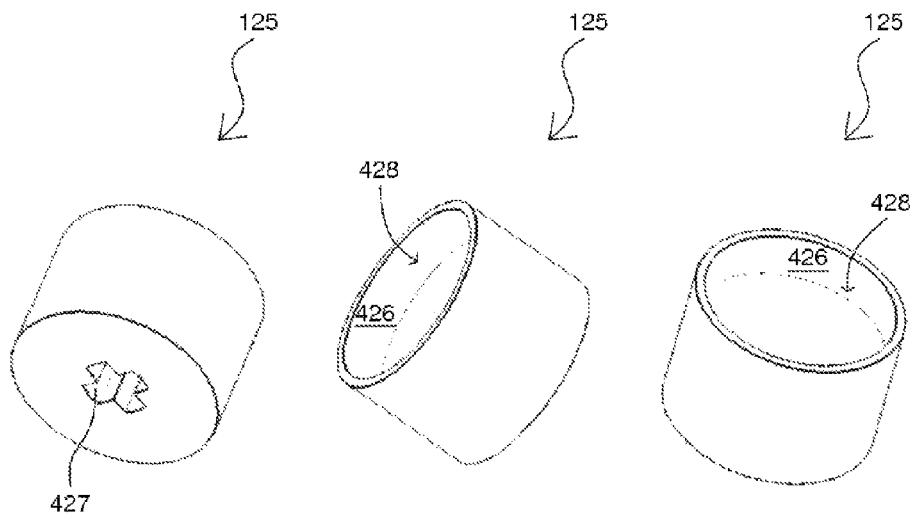
FIGS. 4A-C depict several orientations of a motor connector component.

FIGS. 4A-C depict several orientations of the motor connector component 125. As shown, the motor connector component 125 may include a magnet receiving section 426 and a motor connection section 427, each having a particular geometric shape. One of skill in the art will appreciate that these geometric shapes can take the form of any suitable geometric shape (e.g., a star shape or 'D' shape for the motor connection section 427), and that the shapes shown in the figures are merely included to illustrate certain aspects of the invention. The magnet receiving section 426 may include a cavity 428 that is configured to receive magnet 120b. Adhesive, friction, a mechanical fastener, or another method of attachment may be used to hold magnet 120 bin place within the cavity 428 formed by the magnet receiving section 426. Motor connection section 427 may include a receiving cavity (not labeled) disposed to receive a motor shaft 631 (shown in FIG. 6 and described in more detail below).

Figures 5A, 5B:
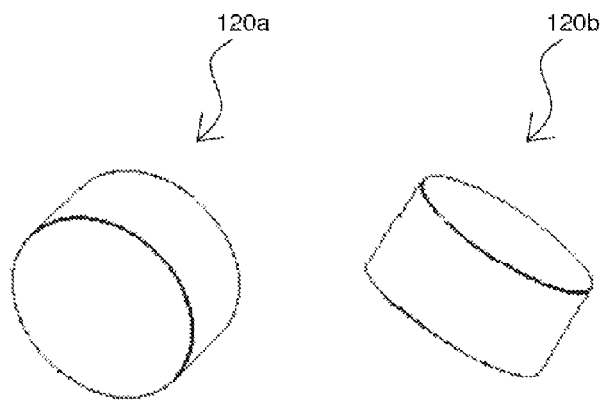
FIGS. 5A-B depict two magnets used in relation to a magnetic clutch.

FIGS. 5A-B depict two magnets 120a and 120b, respectively. When magnetically coupled, under certain pressure constraints, the magnets 120a-b operate as a magnetic clutch that transfers rotational motion from the motor 130, through the motor connector component 125 and the blind connector component 110, and on to an actuating mechanism (e.g., a tilt mechanism) of a blind system (not shown). Pressure between the magnetically attracted surfaces of the magnets 120a-b is maintained while the motor 130 provides rotational motion until the actuating mechanism of the blind system cannot rotate (i.e., until the blinds controlled by the actuating mechanism are fully closed or open), at which point magnet 120*a* stops spinning and magnet 120*b* continues to spin until the motor 130 stops. Once the motor 130 stops, the magnets 120*a-b* once again magnetically couple to each other.

One of skill in the art will appreciate that a friction clutch could be used by replacing the magnets with a suitable material. One of skill in the art will appreciate alternative embodiments that do not use a magnetic or frictional clutch, where that motor 130 could connect directly or through other components to the blind connector component 110. In accordance with some of these alternative embodiments, a fractional number of rotations of the blind connector component 110 (or the motor shaft 631 described below) may be tracked. Based on the fractional count of rotations, the blind control device could, using preprogrammed information, determine the position of the blinds in relation to a fully-closed position and a fully-open position. Based on a determined position, the blind control device could stop rotation of the blinds when they reach the fully-closed and fully-open position. However, the magnetic clutch embodiment is preferred due to cost and ease of operation.

Figure 6:
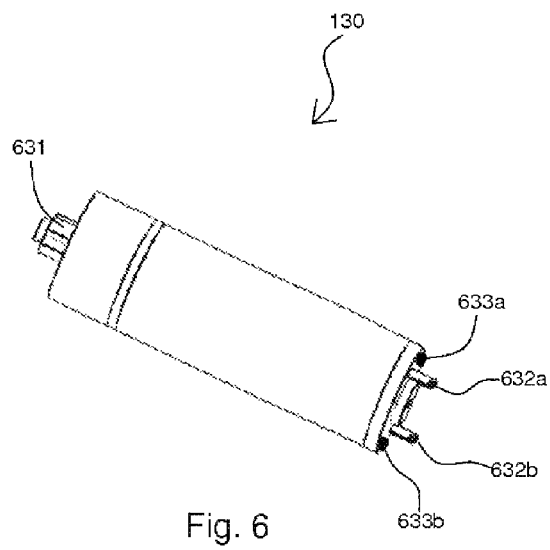
FIG. 6 depicts a motor.

FIG. 6 depicts the motor 130. The motor 130 may be any sort of motor, including an electric motor. As shown, the motor 130 may include a rotatable motor shaft/axle 631, power leads 632, and fastening features 633*a-b*. As shown and previously described, the motor shaft 631 may be configured to be inserted into the motor connection section 427 of the motor connector component 125. The motor shaft 631 is shown to have an external gear that may be inserted into the motor connection section 427. The motor shaft 631 is also shown to have an external gear having a particular geometric shape that mates with the shape provided by the motor connection section 427 or the motor connection cavity 1813. One of skill in the art will appreciate that the geometric shape of the external gear may take the form of any suitable geometric shape (e.g., a star shape or 'D' shape), and that the shapes shown in the figures are merely included to illustrate certain aspects of the invention. One of skill in the art will further appreciate that an internal gear may be used for the motor shaft 631, and that the motor connection section 427 (or some other component connected to the motor connection section 427) may be shaped to compatibly couple to the internal gear.

Adhesive, friction, mere insertion, a mechanical fastener, or another method of attachment may be used to hold the hold the motor connector component 125 in place around the motor shaft 631. When the motor shaft 631 rotates upon delivery of electrical current via power leads 632, the rotational energy may be transferred to the blind connector component 110 through the motor connector component 125 and the magnets 120*a-b*, which operate as a magnetic clutch as previously described. Power leads 632 operate to deliver power the motor 130 from batteries 155 via the circuit board 145 of FIGS. 1-2. Fastening features 633*a-b* may include adhesive, insertable mechanical components, cavities to receive insertable mechanical components, or other methods for preventing the motor from spinning inside the motor housing 135.

One of skill in the art will appreciate that the motor 130 may operate to control an actuator of a blind system without the magnetic clutch. For example, the motor shaft 631 could directly attach to the actuator of the blind system or to some intermediate component between the actuator and the motor shaft 631 (e.g., connector 1810).

One of skill in the art will appreciate that the motor 130 may operate with a rotational count mechanism (not shown) that counts a number of rotations of the motor. Such a rotational count mechanism may be integral with or connected to the motor or circuit board 145. By knowing the number of rotations of the motor shaft 631, the motor shaft can be instructed not to over-rotate the actuator of a blind system, thereby preventing damage to the blind system or blind control device, and also reducing unnecessary power use of the batteries 155. Knowing the number of rotations will permit the blind control device or a remote control device to track start and stop positions of the motor shaft for further control of the motor shaft and additional precision in relation to the operation of the blind control device.

Figures 7A, 7B, 7C, 7D:
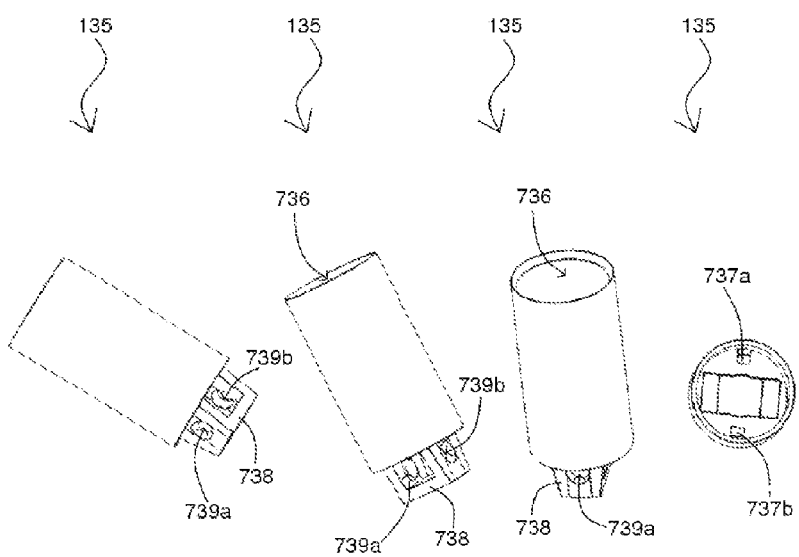
FIG. 7 depicts a motor housing

FIG. 7 depicts the motor housing 135. As shown, the motor housing 135 forms a cavity 736 configured to receive the motor 130. The motor housing 135 includes fastening features 737*a-b*, which compliment fastening features 633*a-b* of FIG. 6. The motor housing 135 also includes a locking section 738 with pin holes 739*a-b* that are configured to receive pin 140, which may be inserted through the outer housing 105 and through the pin holes 739*a-b* to prevent the motor housing 135 from rotating. One of skill in the art will appreciate that preventing the motor housing 135 from rotating may be accomplished using various methods other than using the pin 140, including methods that use adhesive, other mechanical fasteners and features (e.g., screws, clips, tongue and groove), or other techniques understood by one of skill in the art.

When the motor 130 is inserted into the motor housing 135, the power leads 632*a-b* may extend into and/or beyond the locking section 638. Upon insertion of the motor 130 into the motor housing 135, the leads 632*a-b* may reside on opposite sides or the same side of an inserted pin 140. The leads 632*a-b* are configured to connect to respective power terminals 847*a-b* of the circuit board 145 shown in FIG. 8 and described in further detail below.

Figure 8:
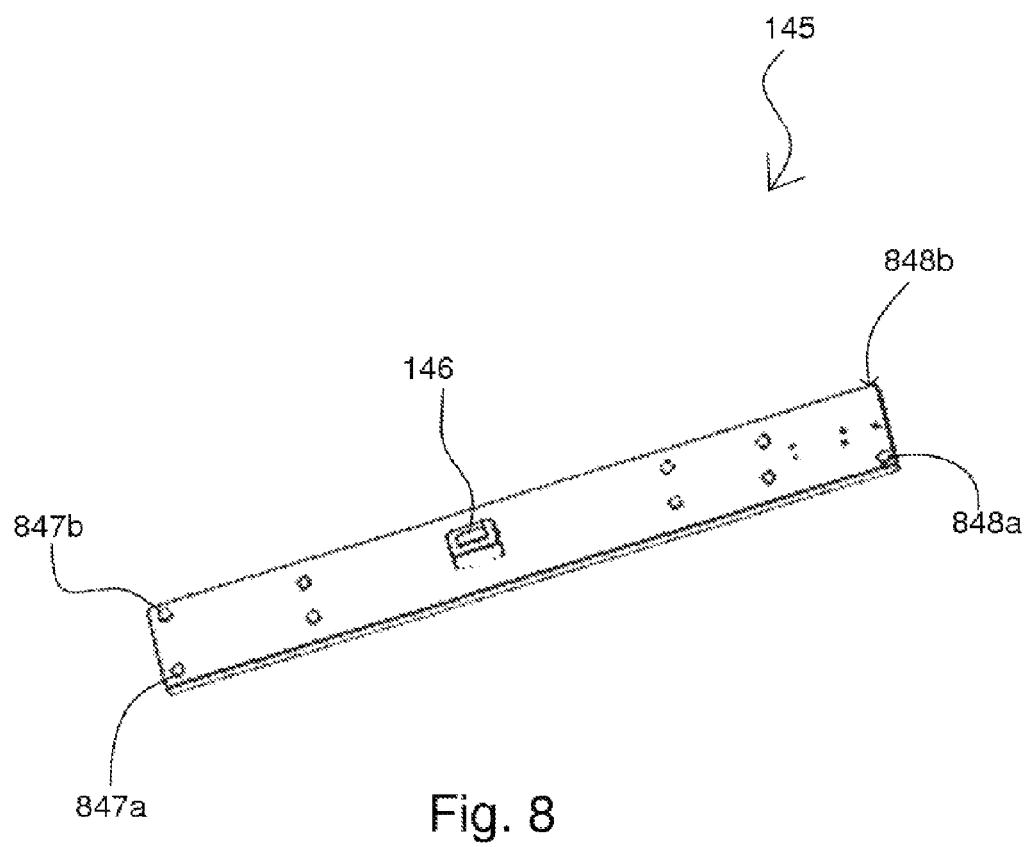
FIG. 8 depicts a circuit board.

As previously mentioned, FIG. 8 depicts a circuit board 145. As shown, the circuit board 145 includes the control interface 146, power terminals 847*a-b* and power terminals 848*a-b*. Power terminals 847*a-b* may connect to leads 632*a-b*, respectively. Power terminals 848*a-b* are described in more detail later. Although not shown, the circuit board 145 may include any number and type of sensor (using any of the sensor technology described herein), database, processing, display, counting or other computing or electrical components.

The functionality of the control interface 146 may include programming of functional instructions, transmitting/receiving of signals/data to/from other components (e.g., sensors, motors, wireless devices, processing components that carry out instructions stored in memory, etc.), and controlling of the motor shaft 631. Accordingly, the control interface 146 may include an interface for programming and controlling the operation of the blind control device 100, including the motor shaft 631. The control interface 146 may further include an interface for sending and receiving signals. Signals received by the control interface 146 may indicate different types of information, including a direction or position of the motor shaft 631, a fractional number of times the motor shaft 631 has rotated in one or more directions, a position of the blinds (e.g., in relation to a minimum and maximum rotation position), a sensed temperature level, a sensed light amount, or a sensed motion.

The control interface 146 may comprise a push switch that, when pushed, will pair the device 100 with a remote control, or with one or more buttons on the remote control. The remote control may then instruct the circuit board 145 (e.g., one or more processing and control components thereon) to control the operation of the motor 130 to open or close blinds of a blind system. One of skill in the art will appreciate that such a push switch may be replaced by a signal transceiver and a signal processor that operate to receive a wireless signal and process it in accordance with the methods described herein to control the motor 130.

Although not shown, the circuit 145 may include a processor operable to process information described herein (e.g., sensor information, user instructions, etc.). That processing component may execute instructions stored in memory to control the operation of the motor based on the information.

Attention is now turned to FIG. 9, which depicts a different orientation of the first portion 200 previously described in relation to FIG. 2 and other figures. FIG. 9 depicts leads 632a-b and terminals 847a-b, which are respectively coupled together to deliver power to the motor 130 and/or to structurally join the circuit board 145 to the motor 130, which may be fastened to the motor housing 135 as previously described. The circuit board 145 may also be fastened to the locking section 738 of the motor housing 135 using adhesive, other mechanical fasteners and features (e.g., screws, clips, tongue and groove), or other techniques understood by one of skill in the art.

Figure 10:
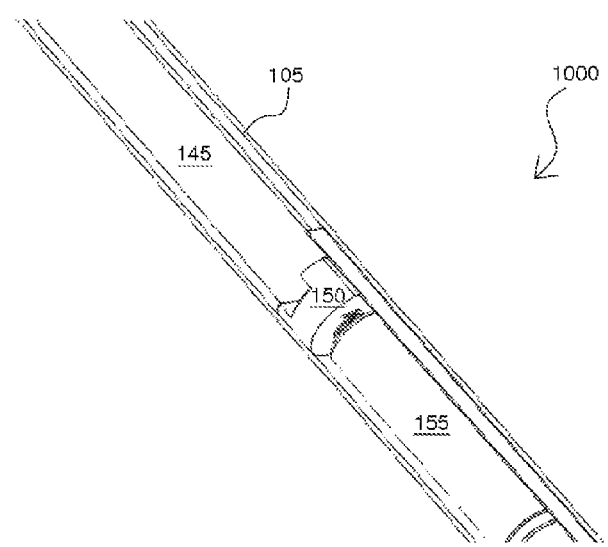
FIG. 10 depicts a second portion of a blind control device.

FIG. 10 depicts a second portion 1000 of the blind control device 100 of FIGS. 1A-C. As shown, outer housing 105 includes the circuit board 145, the first battery connector 150, and the one or more batteries 155. FIG. 10 also depicts the power lead 165, which attaches to power terminal 848b (not shown) of the circuit board 145. The power lead 165 may also operate to structurally reinforce the position of the circuit board 145 in relation to other components like the first battery connector 150. In additional or alternatively, the circuit board 145 may be fastened to the first battery connector 150 using adhesive, other mechanical fasteners and features (e.g., screws, clips, tongue and groove), or other techniques understood by one of skill in the art.

Figures 11A, 11B, 11C:
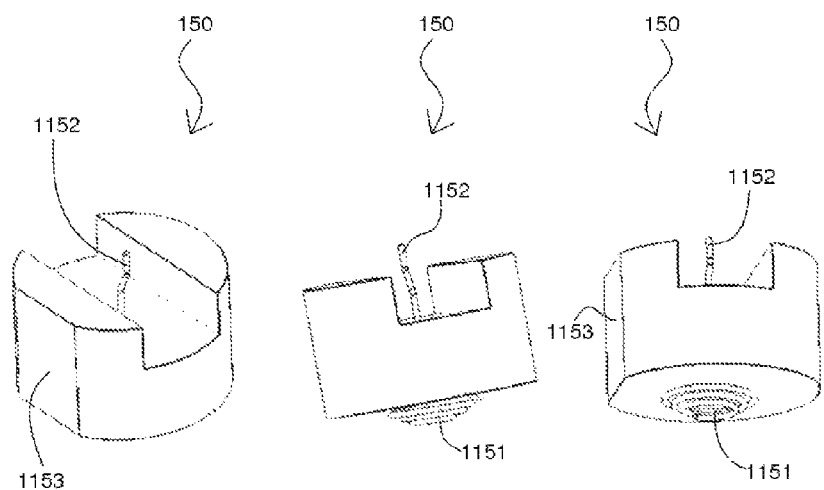
FIG. 11 depicts a first battery connector.
Figure 12:
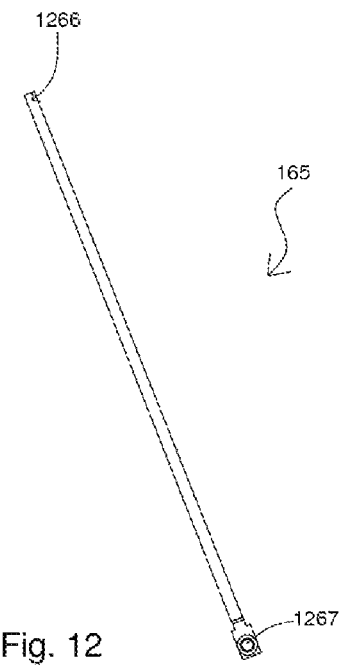
FIG. 12 depicts a power lead.

As shown by the combination of FIG. 10 and FIG. 11, a positive terminal of one battery 155 contacts a spring 1151 of the first battery connector 150, and power is delivered from the battery, through the spring 1151 and to power terminal 848a of the circuit board 145 via power lead 1152 of the first battery connector 150. FIG. 11 also shows a flat wall 1153 of the first battery connector 150 that is configured to permit the power lead 165 to extend through the space inside the outer housing 105 that the first battery connector 150 occupies. The power lead 165, which is depicted in FIG. 12, may be fastened to the first battery connector 150 using any of the techniques described herein or known in the art. Alternatively, the power lead 165 could terminate near the spring, and a second power near power lead 1152 could connect to power terminal 848b of the circuit board 145 (configuration not shown).

Figure 13:
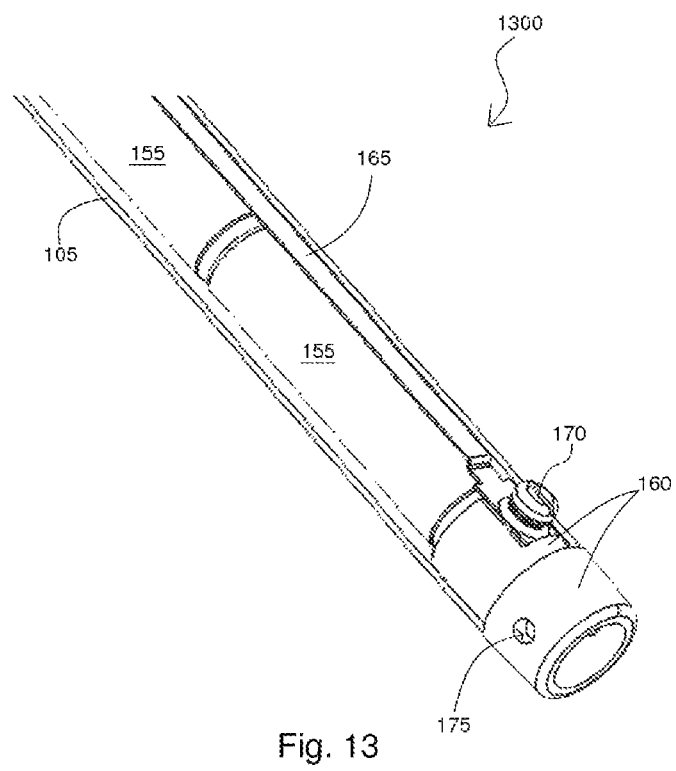
FIG. 13 depicts a third portion of a blind control device.

As shown in FIG. 12, the power lead 165 may include a surface area 1266 that couples to the power terminal 848b. As shown by the combination of FIG. 12 and FIG. 13, which depicts a third portion 1300 of the blind control device 100 of FIGS. 1A-C, the power lead 165 may further include a screw hole 1267 configured to receive screw 170.

Figures 14A, 14B, 14C, 14D:
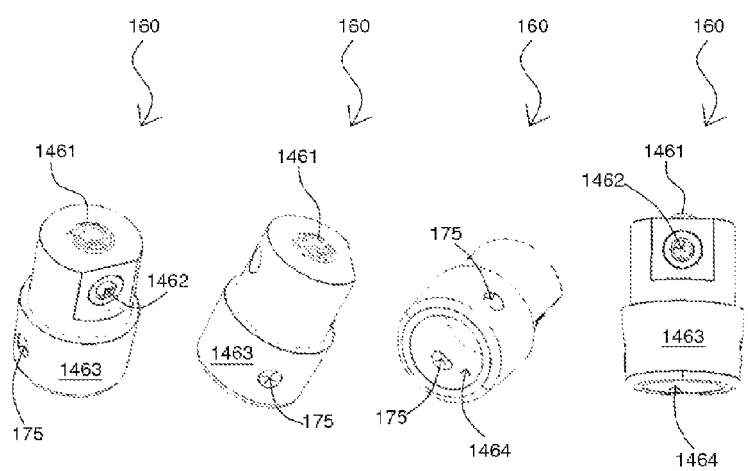
FIG. 14 depicts a second battery connector.
Figure 20:
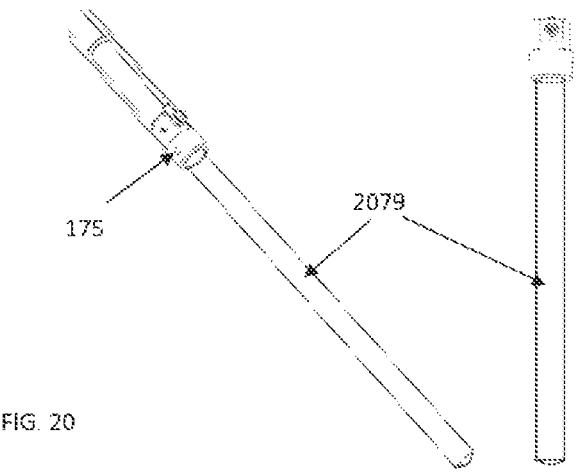
FIG. 20 depicts a rod extension configuration.

FIG. 14 depicts the second battery connector 160. As shown, the second battery connector 160 may include a spring 1461 that contacts a negative terminal of one battery 155 (as indicated in FIG. 13), a screw hole 1462 configured to receive the screw 170, and a receiving section 1463 that forms a cavity 1464 for receiving and securing a rod/baton or other suitable object. For example, a rod is shown in FIG. 20 and designated as 2079. The rod 2079 may be compression fit into the cavity 1464 or otherwise coupled to second battery connector 160 using adhesive, a mechanical fastener (e.g., a screw threaded through opening 175), or other technique.

The batteries 155 may be removed after the second battery connector 160 is disengaged from the outer housing 105. Removal of the batteries 155 may be carried out without any need to remove the blind control device 100 from the blind system to which it is coupled. The ease of removing batteries in this fashion is yet another advantage of certain aspects of the present invention over previous blind control systems.

The batteries 155 may be of any type in relation to size, shape and voltage. The batteries 155 may also be rechargeable. Although not shown, a solar charger may be connected to or integral with the device 100 to recharge the batteries 155. Such a charger could wrap around or otherwise attach to the outer housing 105, or could be adapted to removably connect to the device 100 and the batteries 155 for the purpose of charging the batteries 155.

Attention is now turned to FIGS. 15A-B and 16A-C, which collectively depict different embodiments of the invention that prevent the blind control device 100 from spinning freely during operation, and which ensure that rotational motion from the motor 130 is directed to an actuating mechanism of a blind system that manipulates the blinds to open, close or perform some other movement.

Figures 15A, 15B:
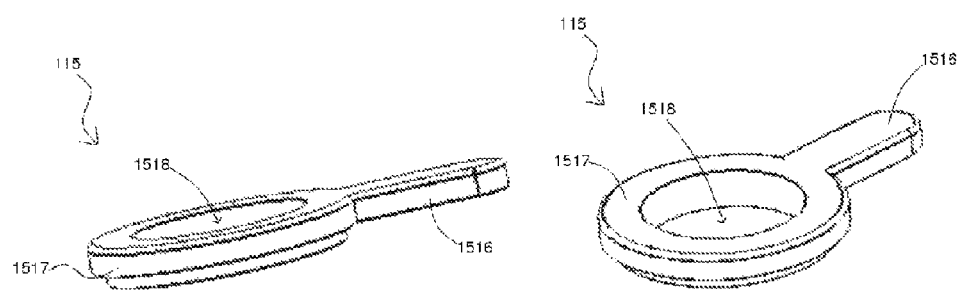
FIGS. 15A-B depict different orientations of an anti-rotation feature.

FIGS. 15A-B depict the anti-rotation feature 115 at different orientations. As shown in FIGS. 15A-B, the anti-rotation feature 115 includes a tongue section 1516, and a perimeter section 1517 (e.g., in the shape of a ring) that forms an opening 1518. The opening 1518 may be sized to fit over part of the blind connector component 110. The perimeter section 1517 may include a lip section that fits into an opening of the outer housing 105 and that attaches to the outer housing 105. The attachment may be accomplished using any of the techniques described herein in relation to other features of invention, including adhesion and mechanical features.

Figures 16A, 16B, 16C:
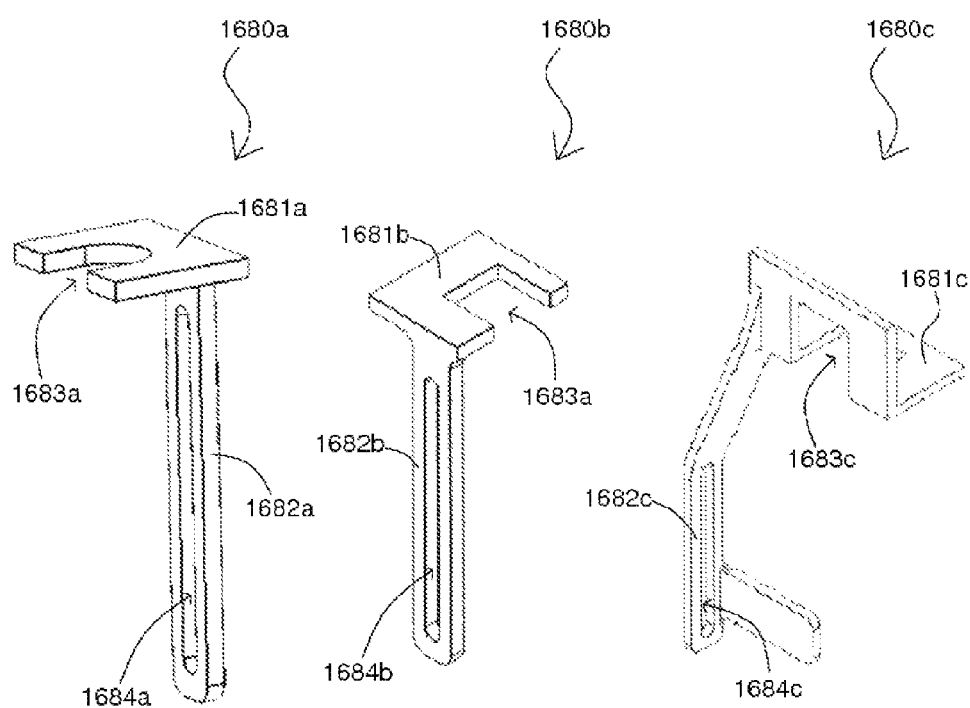
FIGS. 16A-C depict different adaptors that attach to various blind systems.

FIGS. 16A-C depict different adaptors 1680a-c that attach to various blind systems. As shown, each adaptor 1680a-c includes a respective attachment feature 1681 with an opening 1683 that receives a portion the blind system, thereby securing the adaptors 1680 to the blind system. Once the adaptors 1680 are secured, the blind control device 100 may be connected to the blinds system, and the tongue section of the tongue component 115 may be inserted into an opening 1684 formed by a structural element 1682.

The anti-rotation feature 115 and adaptor 1680 operate to prevent the outer housing 105 and any component securely attached to it (e.g., the motor housing 135 via pin 140 or other attachment technique described herein) from rotating when the motor shaft 631 rotates. The anti-rotation feature 115 and adaptor 1680 ensure that the rotational motion from the motor shaft 631 is not transferred to the outer housing 105, and is instead transferred through the motor connector component 125, through the magnetic clutch (e.g., magnets 120a-b), through the blind connector component 110, and to the actuating mechanism of a blind system. During rotation initiated by the motor shaft 631 and before the blinds are fully closed or open, the force applied by the tongue component 115 when it is inserted into the adaptor 1680 does not break the magnetic or frictional bond of the magnets 120a-b, thereby ensuring that the rotational motion of the motor shaft 631 is transferred by the magnetic clutch (e.g., magnets 120a-b) to other components for rotating an actuating mechanism of a blind system.

One of skill in the art will appreciate different designs of the feature 115 and the adaptor 1680 that are within the spirit and scope of the invention. For example, the feature 115 and/or adaptor 1680 may be formed on or attached to the blind system or the blind control device 100 in any manner consistent with the disclosure herein.

Example of Blind System & Blind Control Device

Figure 17:
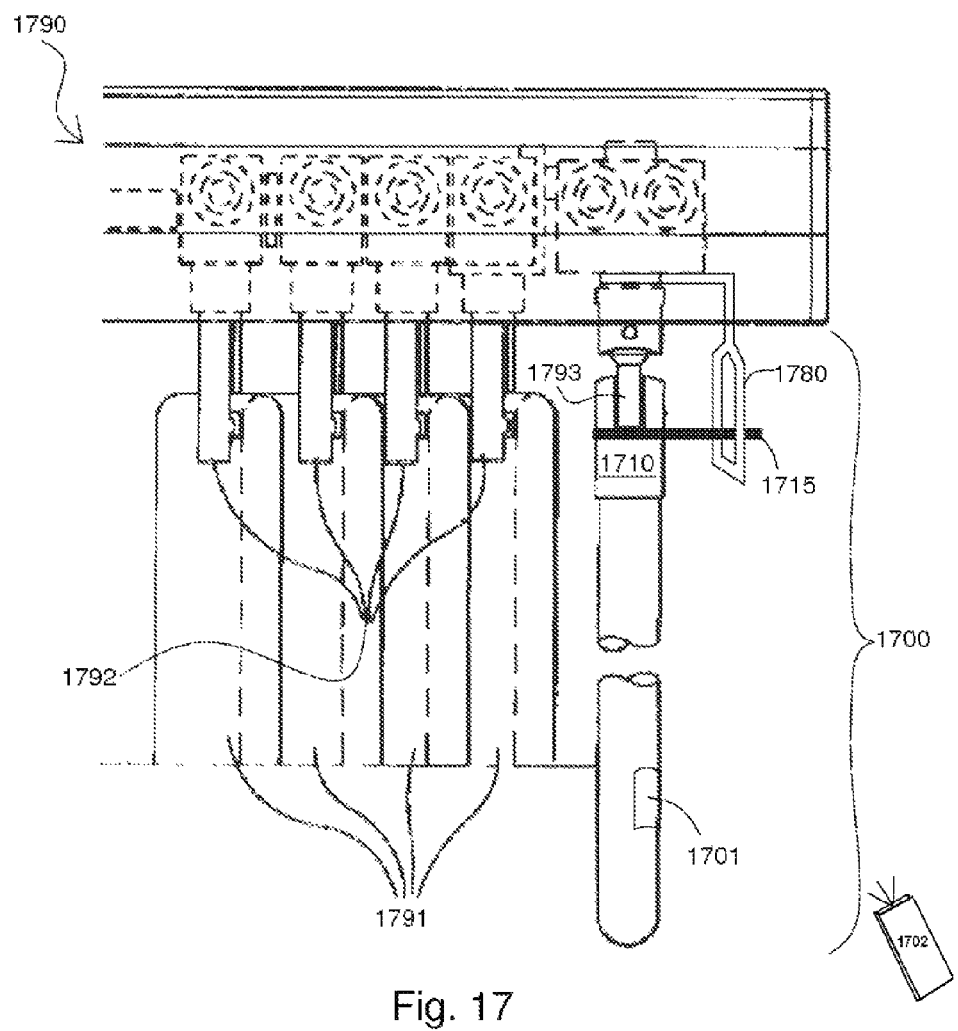
FIG. 17 depicts a blind system coupled to a blind control device having a sensor.

FIG. 17 depicts a blind system 1790 that may include blind louvers 1791, blind tilting mechanisms 1792 and a blind actuating mechanism 1793. The blind actuating mechanism 1793 may be coupled to a blind control device 1700 with an exposed or internal sensor 1701 (e.g., a sensor like those previously described herein). The blind actuating mechanism 1793 may be configured to receive rotational motion from the blind control device 1700, and then transfer that rotational energy, through intermediary components, to the tilting mechanisms 1792. A remote device 1702 may send signals to control the rotational motion of the blind control device (e.g., to control the rotational motion from a motor (not shown) of the blind control device).

Figure 21:
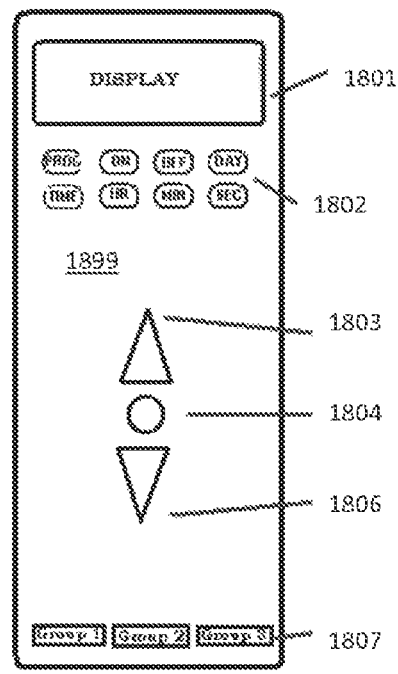
FIG. 21 depicts a remote control device for controlling the operation of a motor.

FIG. 21 depicts a remote control device 1899 for sending instructions to the blind control device 100 for operating the motor 130. The instructions may be received by a receiver (e.g., control 146 or other component on the circuit board 145), and used by a processor or similar component to control the operation of the motor 130.

The remote control device 1899 is preferably digital, but may also be analog. The remote control may include a timer that tracks time and causes the motor 130 to operate based on the tracked time. For example, the timer may cause the motor 130 to cause blinds to open in the morning and close at night. The digital version of the remote control device may include control buttons 1801 for programming the operation of one or more blind control devices 100. Such programming may specify times of operation, degrees to which blinds are opened, and other operations. Also, such programming may be stored locally at the blind control device 100 or on the remote control device.

The control buttons may also include forward and reverse buttons 1803 and 1806 for control the operation of the blind control device 100 and control to direction of rotation for the motor 130. The control buttons may also include a round (or any shape) button 1804 that may select particular blind control devices 100 that will receive particular programming instructions. Selected blind control device 100 may be indicated by number or other designation on the display 1801.

The control buttons may also include group buttons 1807 (e.g., three group buttons 1-3) that allow a user to select various blinds to operate at the same time (eg, blinds 1, 4 and 8). Each button may be programmed for particular groups, and when activated will control only that group. Having group control eliminates the need for individually selecting each blind control device 100 to execute a particular operation.

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The various illustrative logical blocks, modules, circuits and processing or controlling capabilities described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In accordance with certain aspects of the present invention, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

Aspects of the present invention are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present invention may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

As used herein, computer program products comprising computer-readable media including all forms of computer-readable medium except, to the extent that such media is deemed to be non-statutory, transitory propagating signals.

The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

I claim:

1. A system for controlling an actuating mechanism that adjusts one or more blinds, the system comprising:
   a motor having a motor shaft configured to rotate about a first axis;
   a power source configured to power the motor;
   a first connector having a first feature configured to couple the first connector to the actuating mechanism, wherein the first connector is configured to rotate about the first axis when the motor shaft rotates around the first axis;
   a second connector having a second feature configured to couple the second connector to the motor, wherein the second connector is configured to rotate about the first axis; and
   a magnetic clutch comprising a first magnet coupled to the first connector and a second magnet coupled to the second connector, wherein the magnetic clutch is configured to cause the first connector and the second connector to rotate around the first axis when the one or more blinds are partially open and when the motor shaft rotates about the first axis, and wherein the magnetic clutch is further configured to prevent the first connector from rotating around the first axis and to permit the second connector to rotate around the first axis when the one or more blinds are fully open or fully closed and when the motor shaft rotates about the first axis.

2. The system of claim 1, further comprising:
   a receiver configured to receive a first signal from a remote device; and
   a processing component operable to:
      receive the first signal or a second signal that is related to the first signal;
      cause the motor shaft to rotate about the first axis based on the first signal or the second signal.

3. The system of claim 2, further comprising the remote device.

4. The system of claim 1, wherein the motor shaft is coupled to the first connector.

5. The system of claim 1, further comprising a sensor and a controller configured to control the rotation of the motor shaft based on temperature, light, sound or motion information collected by the sensor.

6. The system of claim 1, further comprising an anti-rotation feature attached to or formed on an outer housing and configured to prevent the outer housing from rotating when the motor shaft rotates.

7. The system of claim 1, further comprising:
   a sensor; and
   a processing component operable to:
      receive information from the sensor;
      cause the motor shaft to rotate about the first axis based on first information from the sensor specifying an ambient temperature level that exceeds a predefined threshold temperature level; and
      cause the motor shaft to rotate about the first axis based on second information from the sensor specifying an ambient light level that exceeds a predefined threshold light level.

8. The system of claim 1, further comprising:
   a sensor; and
   a processing component operable to:
      receive information from the sensor;
      cause the motor shaft to rotate about the first axis based on first information from the sensor specifying a sound that matches a stored sound profile; and
      cause the motor shaft to rotate about the first axis based on second information from the sensor specifying a detected motion.

9. The system of claim 1, further comprising:
   a processing component operable to:
      receive information specifying a time of day;
      compare the time of day to a stored time of day to determine if the received time of day matches the stored time of day; and
      cause the motor shaft to rotate about the first axis when the received time of day matches the stored time of day.

10. The system of claim 1, further comprising a processing component operable to:
  receive first user instructions from a remote device over a wireless transmission channel, wherein the first user instructions instruct the processor to cause the motor shaft to rotate about the first axis in a first direction that results in a closure of the blinds;
  cause the motor shaft to rotate in the first direction responsive to the first user instructions;
  receive second user instructions from a remote device over a wireless transmission channel, wherein the second user instructions instruct the processor to cause the motor shaft to rotate about the first axis in a second direction that results in an opening of the blinds; and
  cause the motor shaft to rotate in the second direction responsive to the second user instructions.

11. The system of claim 1, wherein the first connector is disposed between the actuating mechanism and the motor.

12. The system of claim 1, wherein rotation of the first connector causes the actuating mechanism to rotate.

13. The system of claim 1, wherein the motor and the first connector rotate about a vertical axis that extends from the first connector at a top portion of the system to fastener at a bottom portion of the system.

14. The system of claim 1, wherein the blinds and the actuating mechanism form part of a blind system, and wherein the system hangs from the actuating mechanism.

15. The system of claim 1, wherein the system further includes:
  an outer housing;
  an anti-rotation feature attached to or formed on the outer housing; and
  an adaptor that forms an opening into which a tongue section of the anti-rotation feature is inserted to prevent the outer housing from rotating when the motor shaft rotates.

16. A system for controlling an actuating mechanism that adjusts one or more blinds, the system comprising: The system of claim 1, wherein the system includes:
  a motor having a motor shaft configured to rotate about a first axis;
  a power source configured to power the motor;
  a first connector having a first feature configured to couple the first connector to the actuating mechanism, wherein the first connector is configured to rotate about the first axis when the motor shaft rotates around the first axis;
  a first magnet is coupled to the first connector; and
  a second magnet,
  wherein a first surface of the first magnet is magnetically coupled to a second surface of the second magnet,
  wherein the first and second magnets rotate around the first axis when the blinds are not fully opened or closed, and
  wherein the first magnet stops rotating while the second magnet continues to rotate when the blinds are fully opened or closed.

\* \* \* \* \*